(12) United States Patent
Ishimoto et al.

(10) Patent No.: US 7,535,808 B2
(45) Date of Patent: May 19, 2009

(54) TILT CONTROL METHOD AND OPTICAL DISC APPARATUS

(75) Inventors: Tsutomu Ishimoto, Saitama (JP); Kimihiro Saito, Saitama (JP)

(73) Assignee: Sony Corporation, Tokyo (JP)

( * ) Notice: Subject to any disclaimer, the term of this patent is extended or adjusted under 35 U.S.C. 154(b) by 829 days.

(21) Appl. No.: 11/039,805

(22) Filed: Jan. 24, 2005

(65) Prior Publication Data

US 2005/0180283 A1  Aug. 18, 2005

(30) Foreign Application Priority Data

Feb. 12, 2004  (JP)  ............... 2004-035814
Oct. 5, 2004  (JP)  ............... 2004-292426

(51) Int. Cl.
*G11B 5/58* (2006.01)
(52) U.S. Cl. ............... 369/53.22; 369/124.12
(58) Field of Classification Search ............... None
See application file for complete search history.

(56) References Cited

U.S. PATENT DOCUMENTS

| | | | | | |
|---|---|---|---|---|---|
| 5,452,278 | A | * | 9/1995 | Kwon et al. | 369/53.23 |
| 6,128,258 | A | * | 10/2000 | Kimura et al. | 369/44.32 |
| 6,298,026 | B1 | * | 10/2001 | Suzuki et al. | 369/112.24 |
| 6,526,007 | B1 | * | 2/2003 | Fujita | 369/44.32 |
| 6,631,112 | B1 | * | 10/2003 | Kurita et al. | 720/638 |
| 6,717,896 | B1 | * | 4/2004 | Imanishi | 369/53.27 |
| 6,724,696 | B2 | * | 4/2004 | Kim et al. | 369/44.16 |
| 6,795,254 | B2 | * | 9/2004 | Hineno | 359/719 |
| 7,057,998 | B1 | * | 6/2006 | Oumi et al. | 369/112.23 |
| 7,106,683 | B2 | * | 9/2006 | Saito et al. | 369/112.24 |
| 7,126,893 | B2 | * | 10/2006 | Sasaki et al. | 369/47.22 |
| 7,133,340 | B2 | * | 11/2006 | Takeda | 369/53.19 |
| 7,274,631 | B2 | * | 9/2007 | Kumagai | 369/44.32 |
| 7,292,741 | B2 | * | 11/2007 | Ishiyama et al. | 385/12 |
| 7,394,734 | B2 | * | 7/2008 | Ishimoto | 369/44.35 |
| 7,406,016 | B2 | * | 7/2008 | Ishimoto | 369/53.28 |
| 7,440,383 | B2 | * | 10/2008 | Saito et al. | 369/112.24 |
| 7,462,855 | B2 | * | 12/2008 | Saito et al. | 250/559.37 |
| 2003/0076749 | A1 | * | 4/2003 | Kurita et al. | 369/13.12 |
| 2004/0037189 | A1 | * | 2/2004 | Sasaki et al. | 369/47.51 |
| 2004/0145977 | A1 | * | 7/2004 | Sakai et al. | 369/44.32 |
| 2004/0257920 | A1 | * | 12/2004 | Takahashi et al. | 369/13.4 |
| 2005/0259530 | A1 | * | 11/2005 | Ishimoto et al. | 369/44.32 |
| 2006/0023577 | A1 | * | 2/2006 | Shinoda et al. | 369/44.23 |

FOREIGN PATENT DOCUMENTS

JP  2000149312 A  *  5/2000

* cited by examiner

*Primary Examiner*—Joseph H Feild
*Assistant Examiner*—Parul Gupta
(74) *Attorney, Agent, or Firm*—Oblon, Spivak, McClelland, Maier & Neustadt, P.C.

(57) ABSTRACT

According to a preferred embodiment of the present invention, in order to provide a tilt control method and optical disc apparatus capable of exerting control to eliminate tilt and capable of carrying out an appropriate gap servo operation, a light gathering element positioned facing a disc recordable with a signal, and capable of gathering light irradiated from a light source as near-field light at a position where a distance to the disc constitutes a first distance is made to come into contact with the disc (step 2), and tilt is controlled with the light gathering element in contact with the disc (steps 3 to 7). As a result, tilting with respect to the disc is adjusted with the SIL in contact with the disc, tilting can be eliminated in a reliable manner, and a gap servo operation can be carried out in an appropriate manner.

11 Claims, 12 Drawing Sheets

F I G. 4
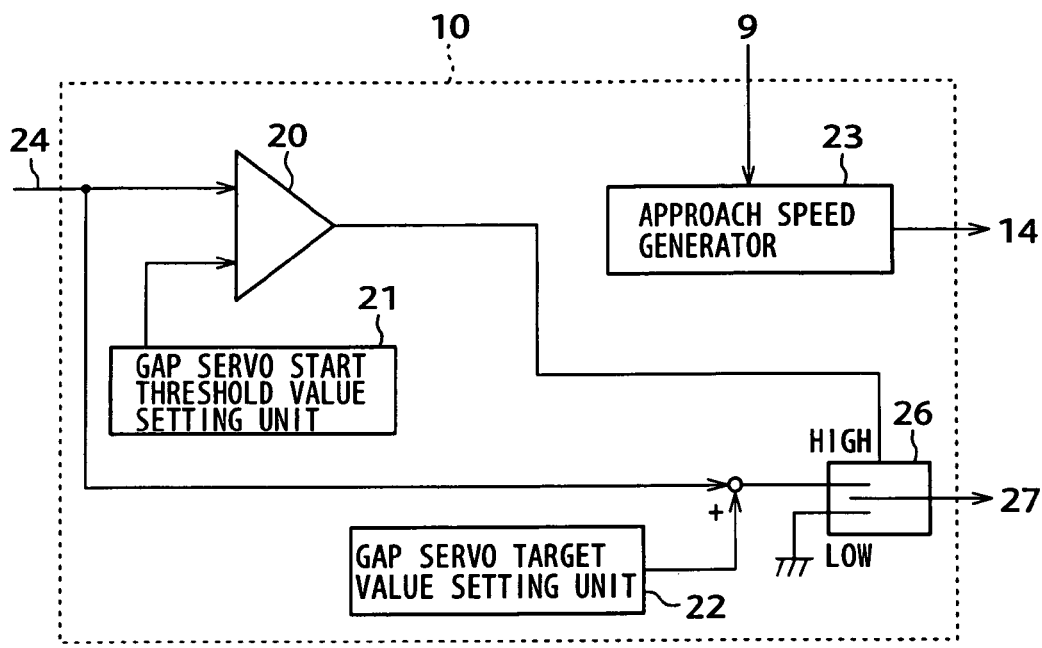
F I G. 5
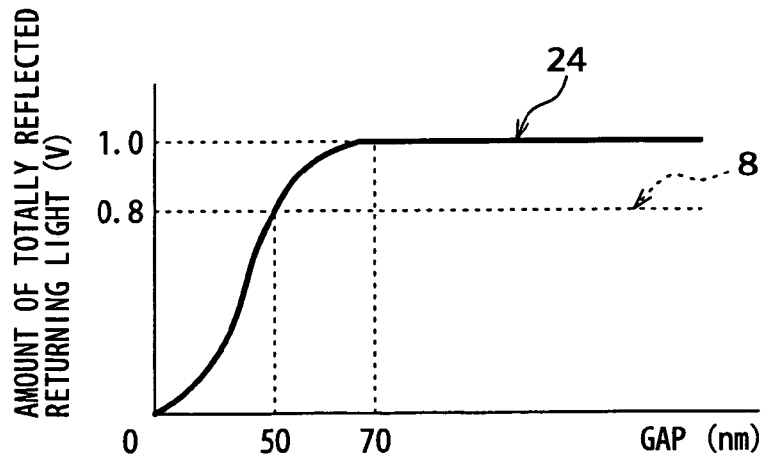

F I G. 9
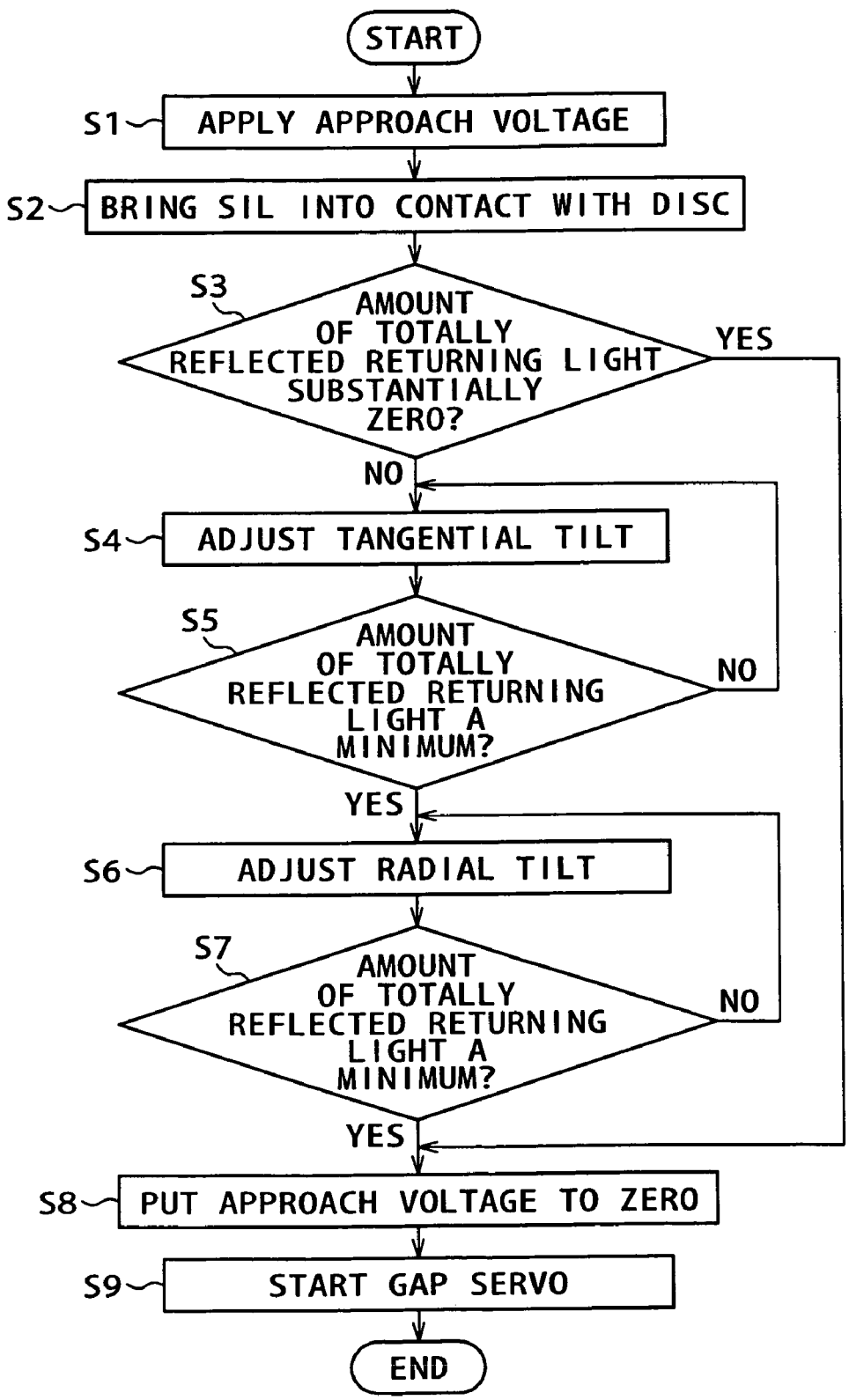

TILT CONTROL METHOD AND OPTICAL DISC APPARATUS

CROSS REFERENCE TO RELATED APPLICATONS

The present document is based on Japanese Priority Documents JP2004-035814 and JP2004-292426, filed to the Japanese Patent Office on Feb. 12, 2004 and Oct. 5, 2004 respectively, the contents of which being incorporated herein by reference.

BACKGROUND OF THE INVENTION

1. Field of the Invention

The present invention relates to a tilt control method and optical disc apparatus applying near-field light to perform at least one of recording and playing back of a signal.

2. Description of Related Art

In the related art, optical disc apparatuses applying laser light in order to increase recording density on an optical disc are proposed for recording or playing back (reproducing) signals using near-field light. With optical disc apparatuses employing near-field light, it is necessary to (gap servo) control a gap between disc and an end surface of an object lens etc., such as an SIL (Solid Immersion Lens) arranged in an optical head to be a distance (near field) at which near-field light is generated.

A method exists for controlling a gap based on an amount of returning laser light reflected from a disc side. In the case of laser light of a wavelength of, for example, 400 nm, a near field state is typically entered at half a wavelength or less. As a result, when the gap is a distance of 200 nm or more, i.e. in a far-field state, light from a laser light source incident on an end surface of an SIL at an angle causing total reflection is reflected completely at the end surface of the SIL and the amount of returning light is therefore constant. When the gap length is a distance of 200 nm or less, i.e. when a near field state is entered, the amount of returning light becomes smaller because part of the light incident on the end surface of the SIL at an angle causing total reflection passes through the end surface of the SIL. When the gap between the SIL and the disc is zero, i.e. when the SIL and disc make contact, the entire light incident on the end surface of the SIL at an angle causing total reflection passes through the end surface of the SIL and the amount of returning light is zero. With this technology, an amount of returning light is detected by a photodetector. A gap servo operation is then carried out for the SIL taking this detected amount of returning light as feedback to an actuator (for example, a biaxial device for carrying out focusing servo and tracking servo operations) of the SIL. For example, refer to Japanese Patent Laid-open Publication No. 2002-319157 (paragraph [0025], FIG. 7.

SUMMARY OF THE INVENTION

However, it is necessary to make the tilt of the SIL with respect to the disc approximately zero in order to implement a narrow gap such as a gap for a near field. Even if a small tilt occurs, the SIL may collide with the disc, making arrangement of an end surface of an SIL in a near field difficult. In particular, it is not possible to appropriately detect an amount of light returning from an SIL as a result of tilting occurring. Namely, when tilting is present, the amount of returning light does not become zero even when the SIL makes contact with the disc, and it is not possible to obtain the desired linear characteristic for between the cap and the amount of returning light necessary for the gap servo operation. This constitutes an obstacle to the gap servo operation.

Further, in the event that the tilt is not approximately zero, a coma aberration may occur at the time of recording or reproducing a signal and quality of recording and playback is compromised.

The present invention has been conceived in view of the afore mentioned situation and it is advantageous to provide a tilt control method and optical disc apparatus capable of performing control in such a manner that tilting is eliminated so as to enable an appropriate gap servo operation to be carried out.

In order to bring about the aforementioned advantages, a tilt control method of the present invention includes the steps of (a) causing a first light gathering element, positioned facing a disc recordable with a signal, and capable of gathering light irradiated from a light source as near field light at a position where a distance to the disc constitutes a first distance to come into contact with the disc, and (b) controlling tilting of the light gathering element with respect to a signal recording surface of the disc in a state where the light gathering element makes contact with the disc.

According to a preferred embodiment of the present invention, it may be possible to eliminate tilting in a reliable manner because tilting is controlled with the light gathering element in contact with the disc. As a result, it may be possible to carry out an appropriate gap servo operation. Further, as compared with the case where tilting is controlled with the light gathering element in a near field state and not in contact with the disc, for example, it may be possible to control tilting in a straightforward manner without concern about the gap. It may be therefore possible to achieve higher-quality recording and playback signals as a result of the tilt being substantially zero.

According to a preferred embodiment of the present invention, a further step of detecting the amount of light returning from the light gathering element in contact with the disc is provided, and the step (b) has a step of controlling tilt based on the amount of returning light detected. According to a preferred embodiment of the present invention, it may be possible to perform tilt control while monitoring the amount of returning light with the light gathering element in contact with the disc, and it is therefore possible to control tilting in a more accurate manner.

According to another preferred embodiment of the present invention, the step (b) is included of a step of controlling tilting of the radial direction of the disc and a step of controlling the tilting in the tangential direction of the disc. As a result, it may be possible to make tilting in the second direction considerably small, and a considerably accurate tilt control can be carried out.

According to another preferred embodiment of the present invention, after step (b), a further step of separating the light gathering element from the disc in such a manner that a distance between the light gathering element and the disc becomes a second distance, that is a greater distance than the first distance, where light is not gathered at the disc as near-field light, and a step of controlling separation in such a manner that a distance between the separated light gathering element and the disc becomes the first distance, are carried out. According to this preferred embodiment of the present invention, it may be possible to carry out an appropriate gap servo operation to ensure that tilt is controlled in the so-called near field before starting the gap servo operation. Further, even if tilting occurs, for example, at the second distance, i.e. in the near field due to the dead weight of the light gathering element, this does not present a problem because tilting has been controlled in the near field in advance.

According to another preferred embodiment of the present invention, the disc has a first region recorded with the signal, and a second region, that is a region other than the first region, that is not recorded with the signal, and the step (a) has a step of causing the light gathering element to come into contact with the second region. As a result, it may be possible to control tilting without the a disc signal recording surface at the first region becoming damaged.

According to another preferred embodiment of the present invention, the step (c) is included of a step (d) of detecting the rate of change of the amount of returning light when the light gathering element is inclined by a prescribed tilt angle, and a step (e) of controlling tilt according to the detected rate of change. Change in the amount of returning light is quadratic with respect to the tilt angle of the light gathering element. It is therefore possible to control tilting according to the rate of change of the amount of returning light as in the present invention, i.e., according to the differential of the amount of returning light.

According to another preferred embodiment of the present invention, the step (e) may also have a step of ending controlling of tilting when the rate of change is smaller than a threshold value.

According to another preferred embodiment of the present invention, the step (e) is included of a step of inclining the light gathering element by a first tilt angle in a radial direction of the disc, a step of ending controlling of the tilt in the radial direction in the event that the rate of change of the amount of returning light is smaller than a first threshold value at the time of the inclination in the radial direction, a step of inclining the light gathering element through a second tilt angle in a tangential direction of the disc, and a step of ending controlling of the tilt in the tangential direction in the event that the rate of change of the amount of returning light is smaller than a second threshold value at the time of the inclination in the tangential direction. As a result, it may be possible to eliminate tilting in the two directions. The first tilt angle and the second tilt angle may be the same or may be different. The first threshold value and the second threshold value may also be the same or may be different.

According to another preferred embodiment of the present invention, there is provided a step (e) comprising a step (f) of inclining by a first tilt angle in a first direction, a step (g) of further executing the step (f) in the event that inclining takes place in the step (f) and in the event that a rate of change is negative, a step (h) of performing inclination by a second tilt angle smaller than the first tilt angle in a second direction that is opposite to the first direction in the event that the step (f) is executed in the step (g) and in the event that the rate of change is detected to be positive. In this way, according to another preferred embodiment of the present invention, if it is detected in step (g) that the rate of change is negative, further inclination then takes place in the same first direction, and if whether the rate of change is positive or negative is then detected, it may be possible to determine whether the direction of inclination of tilting is in the correct or incorrect direction. It is therefore possible as a result for convergence to take place in a direction where tilting becomes smaller.

According to another preferred embodiment of the present invention, the step (e) executes the steps (f), (g) and (h) for the radial direction and tangential direction of the disc respectively. As a result, it may be possible to eliminate tilting in the two directions.

The optical disc apparatus according to the present invention includes a light source irradiating light, a light gathering element, arranged opposite a disc recordable with a signal, capable of focusing the light irradiated from the light source onto the disc as near-field light, and means for controlling tilting of the light gathering element with respect to a signal recording surface of the disc with the light gathering element made to approach the disc so as to come into contact with the disc.

According to another preferred embodiment of the present invention, it may be possible to eliminate tilting in a reliable manner because tilting is controlled with the light gathering element in contact with the disc.

As shown above, according to the preferred embodiments of the present invention, it may be possible to make tilt substantially zero, and it may be possible to carry out an appropriate gap servo operation. It is therefore possible to achieve high-quality recording and playback signals as a result of the tilt being substantially zero.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIG. 4 is a block diagram showing the details of the data processor.

FIG. 5 is a view showing example settings for a gap servo start value.

FIG. 9 is a flowchart showing order of adjustment of the first embodiment of the present invention.

DESCRIPTION OF THE PREFERRED EMBODIMENTS

The following is a description based on the drawings of preferred embodiments of the present invention.

Figure 1:
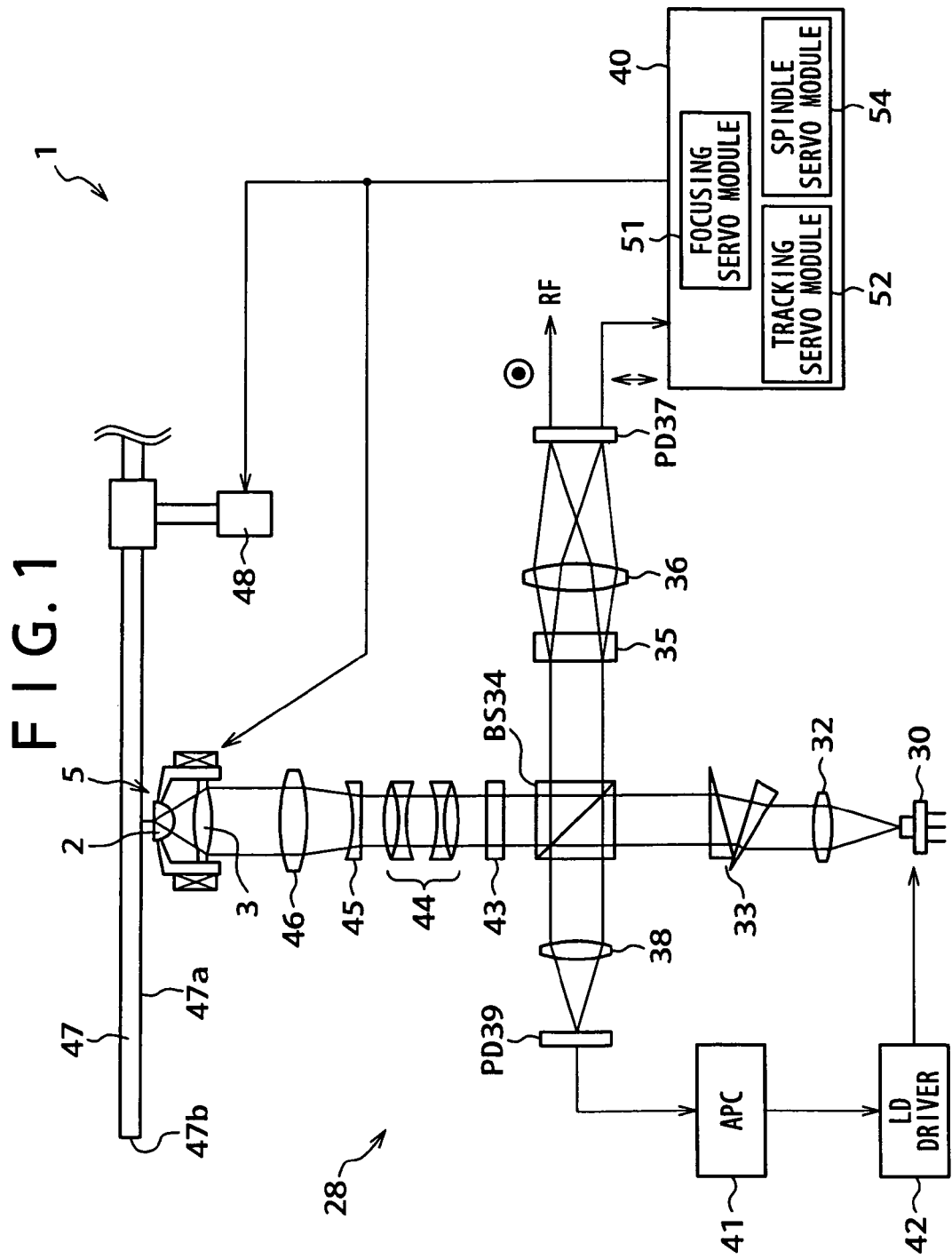
FIG. 1 is a view showing a configuration for an optical disc for a first embodiment of the present invention.

FIG. 1 is a view showing a configuration for an optical disc for a first embodiment of the present invention. An optical disc apparatus 1 is included of an optical head 28, servo control system 40 and spindle motor 48. The optical head 28 includes a laser diode (LD) 30 constituting a light source, collimator lenses 32 and 46, an anamorphic prism 33 for shaping laser light, a beam splitter (BS) 34, a quarter wavelength plate (QWP) 43, a chromatic aberration correction lens 44, a laser beam expanding lens 45, a Wollaston prism 35, light gathering lenses 36 and 38, a light gathering element 5, photodetectors (PDs) 37 and 39, an automatic power controller 41, and an LD driver 42.

The Wollaston prism 35 is composed of two prisms. Light incident on the Wollaston prism 35 goes out as two straight lines of polarized light that are mutually orthogonal. A PD 37 outputs an RP playback signal for playing back a signal recorded on an optical disc, a tracking error signal required in servo control and a focusing error signal etc. to the servo control system 40.

The servo control system 40 is included of a focusing servo module 51, a tracking servo module 52, and a spindle servo module 54. The servo control system 40 is also further included of a coarse movement thread servo module for the optical head 28. The tracking servo module 52 controls tracking of the light gathering element 5 based on the tracking error signal. The tracking control may employ, for example, a method such as a phase difference method, three-beam method, or push-pull method, etc. The spindle servo module 54 controls rotation of the spindle motor 48.

The automatic power controller 41 outputs prescribed signals to the LD driver 42 based on a signal outputted from the PD 39 in such a manner that power of laser light outputted from the LD 31 is fixed.

Next, a description is given of an overall operation of the optical disc apparatus 1. An optical disc 47 constituting, for example, a recording medium, is installed in the optical disc apparatus 1. As a result, each servo control operation is carried out by the servo control system 40. On the other hand, laser light irradiated from the LD 31 is put into the form of parallel light by the collimator lens 32 and is shaped by the anamorphic prism 33. Laser light incident on the BS 34 is divided into light incident as is to the QWP 43 and light incident on the light gathering lens 38 by the BS 34. Laser light incident on the light gathering lens 38 is controlled by the automatic power controller 41 in such a manner that power of the laser light becomes fixed as described above. Light incident on the QWP 43 is such that rectilinear polarized light is put into the form of circularly polarized light by the QWP 43, chromatically corrected by the chromatic aberration correction lens 44, and made incident on the light gathering element 5 via the expanding lens 45 and collimator lens 46.

Laser light incident on the light gathering element 5 is gathered as near-field light at the optical disc 47 as described later, and a signal is recorded onto the optical disc 47. Alternatively, laser light gathered as near-field light at the optical disc 47 is received as reflected light or diffracted light from the optical disc 47 in order to read a signal recorded on the optical disc 47. Reflected light or diffracted light from the optical disc 47 then returns as light via the light gathering element 5 so as to become incident on the BS 34 via the collimator lens 46, expanding lens 45, chromatic aberration correction lens 44 and QWP 43. Laser light completely reflected by the BS 34 is then incident on the PD 37 via the Wollaston prism 35 and the light gathering lens 36. The RF playback signal and servo control signal are then obtained by the PD 37, and the servo control signal is inputted to the servo control system 40 in order to control each servo operation.

Figure 2:
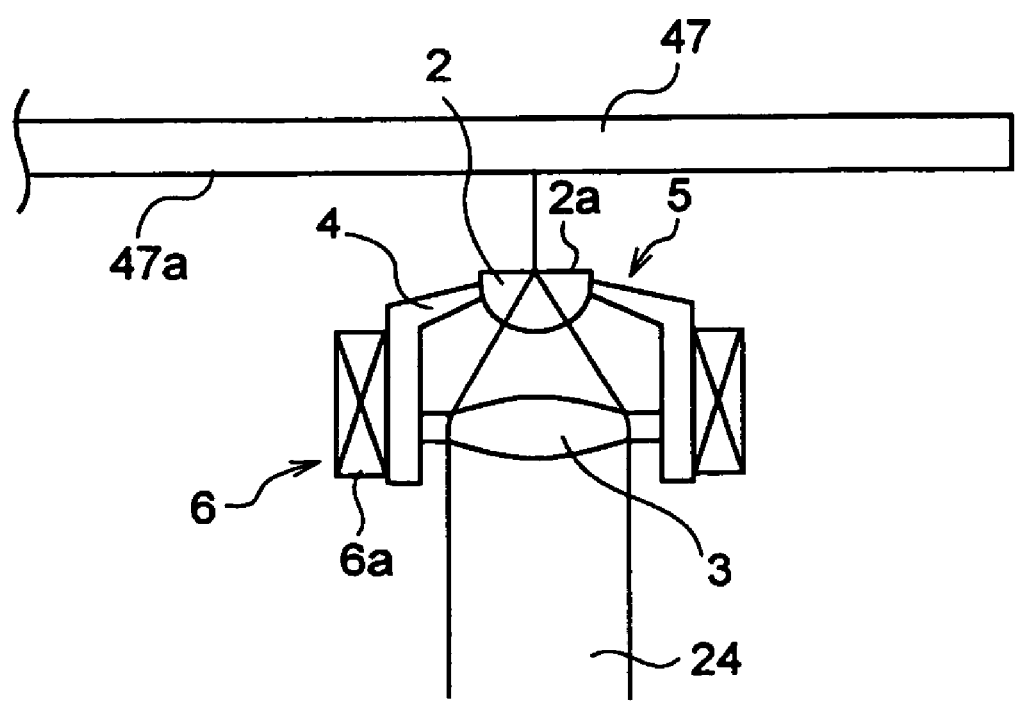
FIG. 2 is a side view showing the light gathering element and the optical disc.

FIG. 2 is a side view showing the light gathering element 5 and the optical disc 47. The light gathering element 5 is arranged facing the optical disc 47. The light gathering element 5 is configured so that the SIL 2 and an aspherical lens 3 are housed in a lens holder 4 and are capable of being moved by a biaxial actuator 6.

Figure 6:
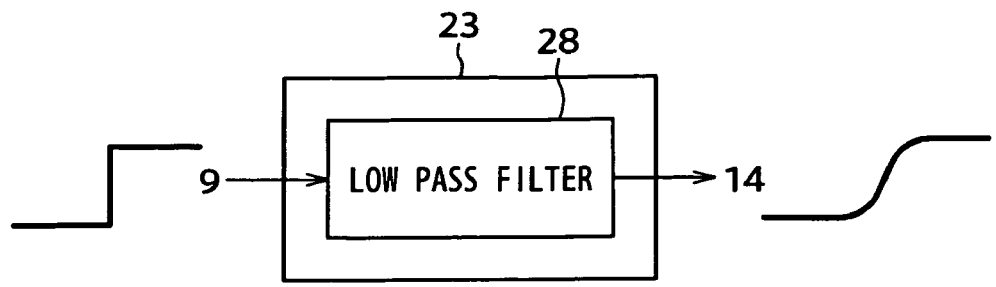
FIG. 6 is a view showing an example configuration for an approach speed generator.

The biaxial actuator 6 carries out tracking and focusing servo operations for the light gathering element 5. As shown in FIG. 6 in simplified form, the biaxial actuator 6 has, for example, a drive coil 6a provided at the light gathering element 5 and a magnet and yoke etc. installed at a fixed section side (not shown). Control of the tracking servo and focusing servo operations is then carried out as a result of a drive current flowing in the drive coil 6a.

Next, a description is given of a focusing servo (gap servo) operation carried out after tilt adjustment described later.

Figure 3:
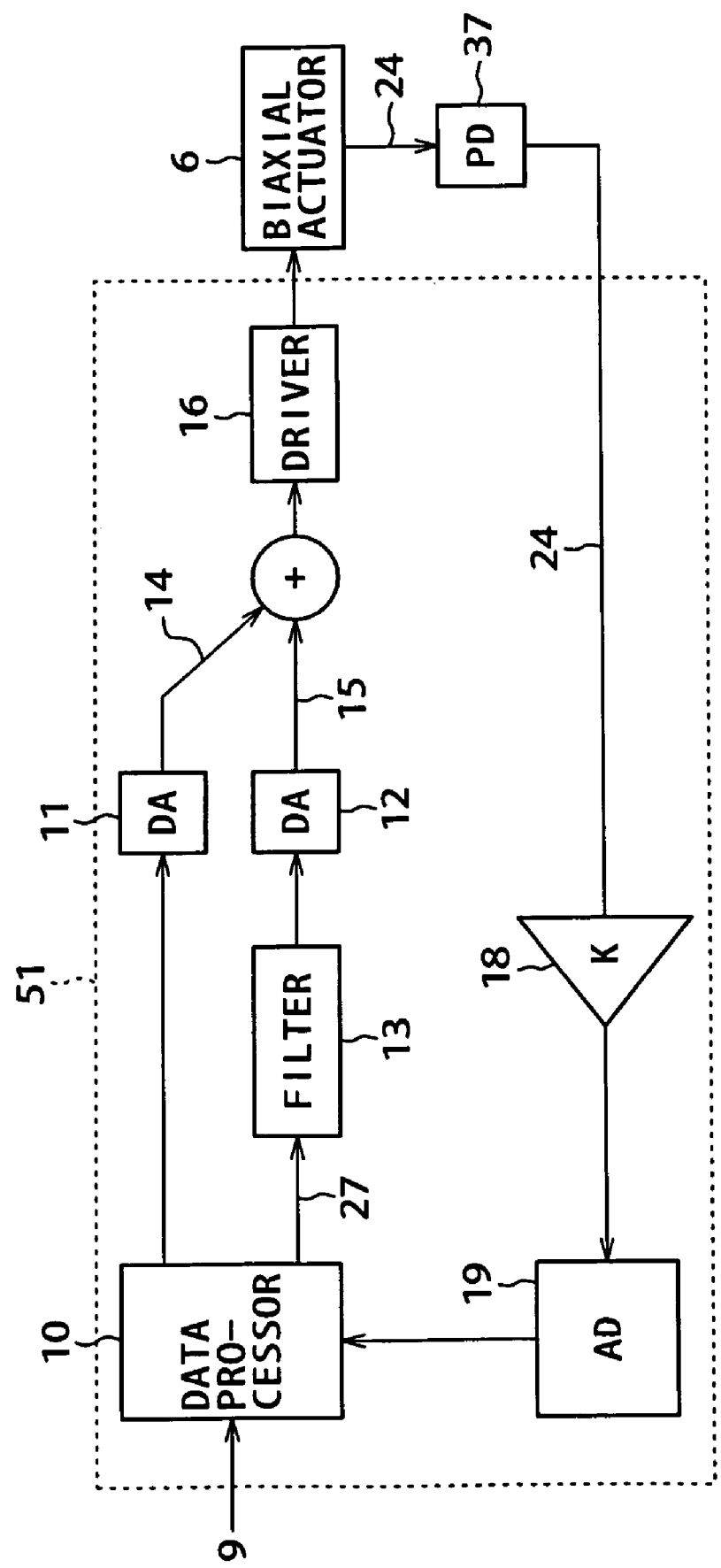
FIG. 3 is a block diagram showing a configuration for a gap servo module.

FIG. 3 is a block diagram showing an outline of the focusing servo module 51. The biaxial actuator 6 is the target of control. Further, the detection amount (amount subject to control) is an amount of completely reflected returning light 24 and this is detected by the PD 37 as described above. The detected amount of completely reflected returning light 24 is normalized to, for example, 1V by a gain normalizer 18. This normalized signal is then put into digital form by an AD (analog to digital) converter 19. The amount of completely reflected returning light put into digital form is then inputted to a data processor 10. A voltage for making the SIL 2 approach the SIL 2 is then outputted by the data processor 10, and this is converted to an analog signal at a DA (digital to analog) converter 11 and outputted as an approach voltage 14. A gap error signal is then inputted to a filter 13, converted to an analog signal at the DA converter 12, and outputted as a servo voltage 15. The filter 13 is configured from, for example, a phase compensation filter. The approach voltage 14 and servo voltage 15 are added together and inputted to the driver 16, and a driver 16 then drives the biaxial actuator 6 in such a manner that the gap error becomes zero.

FIG. 4 is a block diagram showing the details of the data processor 10.

The amount of completely reflected returning light 24 and output of the gap servo switch 9 are inputted to the data processor 10. The gap servo switch 9 may be a signal inputted to the data processor 10 based on an optical disc being loaded into the optical disc apparatus 1, for example, but it is by no means limited to this time. The amount of completely reflected returning light 24 is then compared with a gap servo start threshold value 8 set at a gap servo start threshold value setting unit 21 at a comparator 20.

Further, the gap servo start threshold value 8 may be set as shown, for example, in FIG. 5. Namely, the gap servo start threshold value 8 is set to be a value in the near field that is a value larger than a target value for the gap servo. For example, in FIG. 5, this is set to 0.8 (V) when the value occurring in the far-field for the amount of completely reflected returning light 24 is normalized to 1(V). The gap servo target value is set by the gap servo target value setting unit 22.

From the comparison results of the comparator 20, for example, the output of the comparator 20 is low when the amount of completely reflected returning light 24 is greater than the gap servo start threshold value 8, i.e. when end surface 2a of SIL 2 is in the far-field. On the other hand, the output of the comparator 20 is high when the amount of completely reflected returning light 24 is smaller than the gap servo start threshold value 8, i.e. when the end surface 2a of the SIL 2 is in the near field. The switch 26 goes on at the time where the output of the comparator 20 goes high, and the first gap servo operation is commenced. A servo voltage 27 is outputted in such a manner that the gap becomes the target value by adding the gap servo target value set at the gap servo target value setting unit 22 to the approach voltage (voltage for amount of completely reflected returning light at the time of starting the gap servo operation) at the time of starting the gap servo operation.

FIG. 6 is a view showing an example configuration for an approach speed generator 23. The approach speed generator 23 is configured from, for example, a low pass filter where an input signal is the output of the gap servo switch 9 and an output signal is the approach voltage 14. In this event, an input signal for the gap servo switch 9 is constituted by a stepped signal as shown in FIG. 6. An output of the approach speed generator 23 is then constituted by a signal as shown in FIG. 6 where a stepped signal is put through a low-pass filter. The light gathering element 5 then smoothly approaches the disc 47 based on the signal passed through a low-pass filter. The gap servo then starts at the time where the approach voltage becomes a final voltage value.

Figure 7:
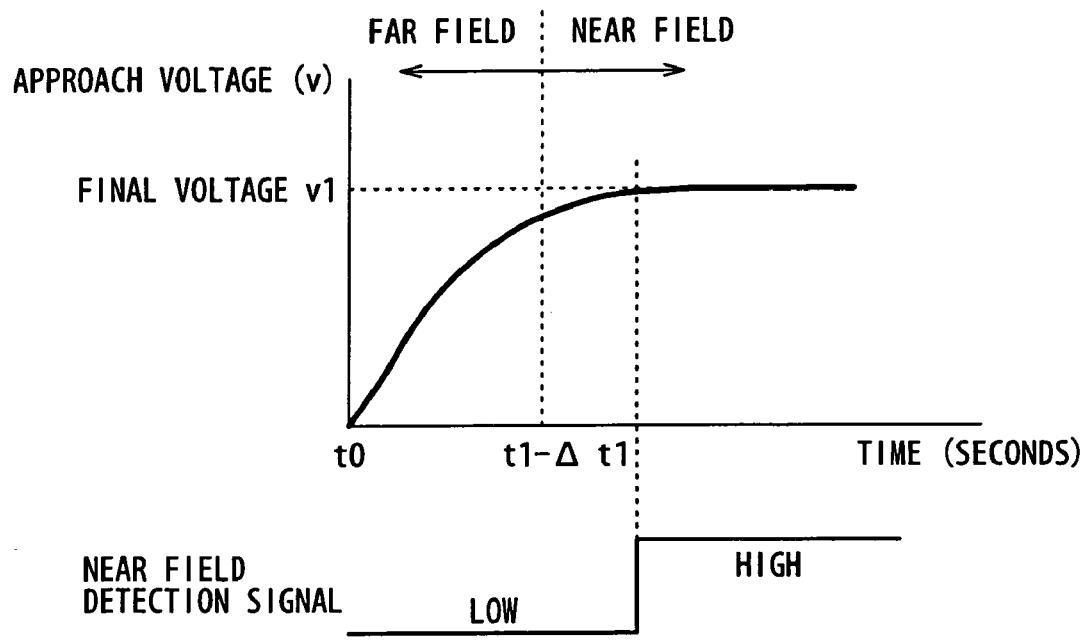
FIG. 7 is a view showing changes over time of an approach voltage outputted from the approach speed generator.

This situation is shown in FIG. 7. In FIG. 7, the output of the comparator 20 goes from low to high at time t1, and a gap servo operation commences. At this event, the approach voltage reaches the value of the final voltage, and the light gathering element 5 is therefore substantially stationary. In other words, the speed of movement at this event is substantially zero. The initial speed of the light gathering element 5 when the gap servo operation starts is therefore substantially zero.

In this embodiment, an initial value for SIL 2 is set in such a manner that the speed of the light gathering element 5 becomes substantially zero at the position of the SIL 2 when the gap servo operation commences. Namely, the distance between the optical disc 47 and the end surface 2a of SIL 2 is set in advance, and the final voltage value is set in such a manner that the speed of the SIL 2 becomes substantially zero at the position of the SIL 2 when the gap servo operation commences. This is because when there is an initial velocity at the time of starting the gap servo operation, there is the possibility of the SIL 2 colliding with the disc 47 and this is therefore to prevent this. This initial value is in the far-field from the optical disc 47. If this initial position for SIL 2 from the disc is set in advance, it may be possible to independently control the approach operation of the SIL 2 due to the approach speed generator 23 and the gap servo operation, and the gap can therefore be controlled using a comparatively simple structure.

Figure 8:
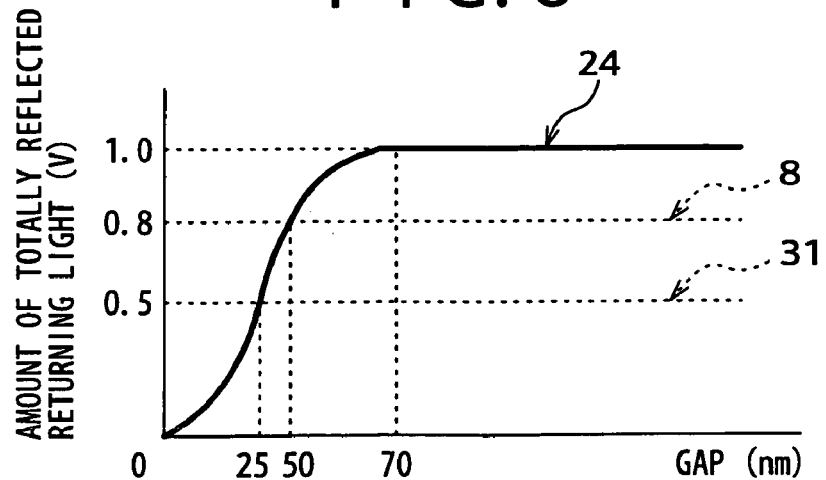
FIG. 8 is a view showing an example of setting the gap servo start threshold value and a gap servo target value.

FIG. 8 shows an example of setting the gap servo start threshold value 8 and a gap servo target value 31. For example, when standardization takes place so that the value at the far-field for the amount of completely reflected returning light 24 becomes 1(V), the gap servo target value 31 is set to be, for example, 0.5(V).

If the optical disc 47 is silicon, for example, the distance the amount of completely reflected returning light 24 starts to go down from is substantially 70 nm, the distance to reaching the gap servo start threshold value 8 is substantially 50 nm, and the gap servo target value 31 is substantially 50 nm.

The presence of the initial position of the light gathering element 5, i.e. the initial position of the end surface 2a of the SIL in the near field is considerably difficult and impractical without a gap servo operation. Because of that, the initial position of the end surface 2a of the SIL is far-field. When the initial position of the end surface 2a of the SIL is in a far-field position, tilt of the SIL 2 occurs in the near field even if the tilt of the SIL 2 is adjusted in the initial state for the far-field. As a result, even if the gap is zero, the amount of completely reflected returning light does not become zero, the relationship between the gap error signal and the amount of completely reflected returning light becomes non-linear, and gap control is unstable. Moreover, because SIL 2 tilts with respect to the disc 47, there is a possibility that SIL 2 will collide with the disc 47 in a near field region. Further, in the event that the SIL 2 tilts, a coma aberration occurs and causes the quality of the recording/playback signal to deteriorate. A tilt control method of a first embodiment of the present invention constitutes a method for ensuring that tilting does not occur at SIL 2 in the near field and that tilting of SIL 2 does not occur at the substantial target control value 31 of the gap servo.

Next, a description is given with reference to a flowchart shown in FIG. 9 of a procedure for tilt control.

The operation for tilt control of this embodiment is carried out before the start of the gap servo operation and in step 1 this is carried out manually utilizing an approach voltage employed in the gap servo operation.

First, an approach voltage (refer to FIG. 7) for going to the near field is applied to the biaxial actuator 6, in step 1. At this event, it is ensured that the switch 26 (refer to FIG. 4) does not go on even if the approach voltage is a final voltage value. Setting of the approach voltage in step 1 is carried out in such a manner that an SIL end surface 2a makes contact with the disc 47 when a final voltage value v1 is applied to the biaxial actuator 6. An approach voltage set in this manner is applied to the biaxial actuator 6 and the SIL 2 is made to make contact with the disc 47, in step 2.

In this event, it may be possible to control tilt without a signal recording surface 47a of the disc 47 becoming damaged by ensuring that a contact position of the SIL 2 on the disc 47 is a region where a signal is not recorded.

Other setting examples for the final voltage value v1 for an approach voltage occurring in step 1, as shown in FIG. 8, may be voltage values corresponding to a gap (70 nm) where the amount of completely reflected returning light 24 starts to fall in the near field. Alternatively, a voltage value corresponding to a gap (50 nm) constituting a threshold value for whether or not a value is a near field value may be set as the final voltage value v1 for the approach voltage. In these cases, the disc 47 is moved with the SIL 2 remaining fixed (the light gathering element 5 is fixed) so that the SIL 2 and the disc 47 come into contact. After tilt adjustment of the SIL 2 described in the following is complete, the position of the disc 47 returns to the original position.

Figure 10:
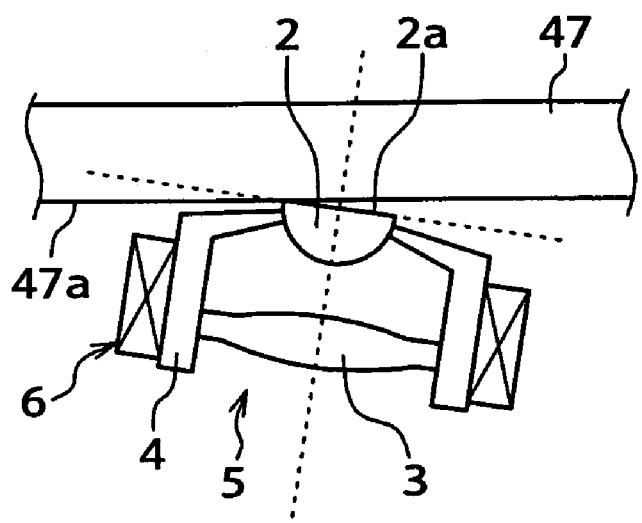
FIG. 10 is a view showing a situation where tilting occurs when an SIL collides with a disc.
Figure 11:
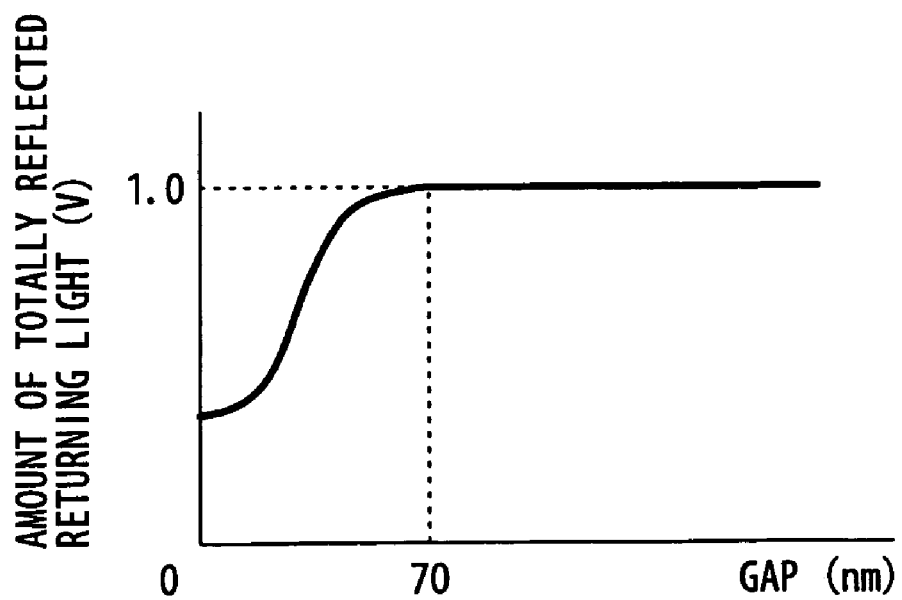
FIG. 11 is a view showing a relationship between a gap and an amount of completely reflected returning light in the event that the SIL is tilted.

FIG. 10 is a view showing a situation where the disc 47 and the SIL 2 make contact. In this state, a check is made as to whether or not the amount of completely reflected returning light is substantially zero (step 3). If the amount of completely reflected returning light is substantially zero, as shown in FIG. 5, the SIL 2 and the disc 47 make contact, i.e. the gap is zero, and the amount of completely reflected returning light becomes zero. However, as shown in FIG. 10, even in the case where the SIL 2 makes contact with the disc 47, in the event that tilting occurs at the SIL 2, at a central part of the SIL 2 obtaining the amount of completely reflected returning light, the gap with the disc 47 does not become zero. The relationship between the gap in the event that SIL 2 is tilted and the amount of completely reflected returning light is shown in FIG. 11, and is such that the amount of completely reflected returning light does not become zero even if the gap is zero. When the gap is zero, i.e. when the SIL 2 and the disc 47 make contact, it can be understood whether or not SIL 2 is tilting by checking whether or not the amount of completely reflected returning light is zero. The tilt of SIL 2 is then adjusted so that the amount of completely reflected returning light becomes zero in cases where SIL 2 is tilting.

In step 3, if the amount of completely reflected returning light is not zero, the SIL 2 is not tilted. Tilt adjustment of SIL 2 is therefore not necessary, the approach voltage applied in step 1 is returned to zero, in step 8, and SIL 2 is drawn away from the disc 47 so as to return to the initial near field position.

In step S3, in the event that the amount of completely reflected returning light is not zero, adjustment is made in such a manner that, for example, tilt in a tangential direction of tilt in two directions becomes a minimum, in steps 4 and 5.

Figure 12:
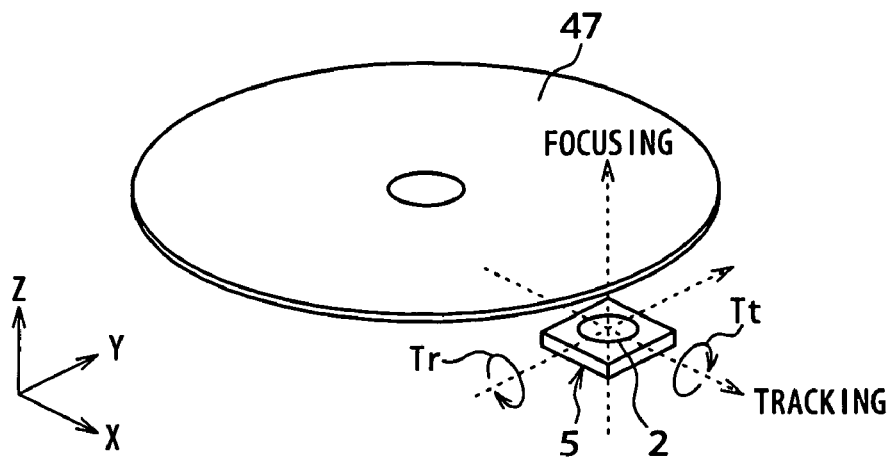
FIG. 12 is a perspective view of a disc and light gathering element for illustrating the tilt direction.

FIG. 12 is a perspective view of a disc 47 and light gathering element 5 for illustrating the tilt direction. In this drawing, in the event that the X direction is taken to be the radial direction of the optical disc 47, a Y direction orthogonal to the X-direction is taken to be a tangential direction. In this case, tilt in the tangential direction is constituted by a tilt angle (Tt) about an X-axis and tilt in a radial direction is constituted by a tilt angle (Tr) about a Y-axis.

After tilt in the tangential direction is adjusted, adjustment is performed so that tilt in a radial direction becomes a minimum, in steps 6, 7. In this way, tilt adjustment is complete. It is therefore possible to achieve highly-accurate tilt adjustment by adjusting tilt in two directions in this manner. In the above, tilt adjustment is complete, but in the case of further adjustment, it is also possible to force the tilt of the SIL 2 to zero by returning to step 4 and repeating radial tilt and tangential tilt adjustment.

When tilt adjustment of the SIL 2 is complete, the approach voltage applied in step 1 is returned to zero (step 8). When the approach voltage is returned to zero, the SIL 2 returns to the initial far-field position. When SIL 2 returns to the initial position, the gap servo operation described above commences, in step 9.

In step 8, in the event that the applied approach voltage is returned to zero, the SIL 2 is returned to the initial position, but there are cases where the SIL 2 returned to the initial position is tilted with respect to the disc 47. However, if the cap servo operation starts in step 9, because tilt adjustment is performed in the near field in advance, the tilt is substantially zero when the end surface 2a of the SIL 2 is retracted to the near field and the tilt is substantially zero. Further, the end surface 2a of the SIL 2 is in the far-field before the start of the approach of the SIL 2 to the near field. Light incident on the SIL 2 is therefore all completely reflected at the end surface of the SIL 2 so that the amount of completely reflected returning light is fixed. There is therefore no problem even if, for example, SIL 2 is tilted.

Figure 13:
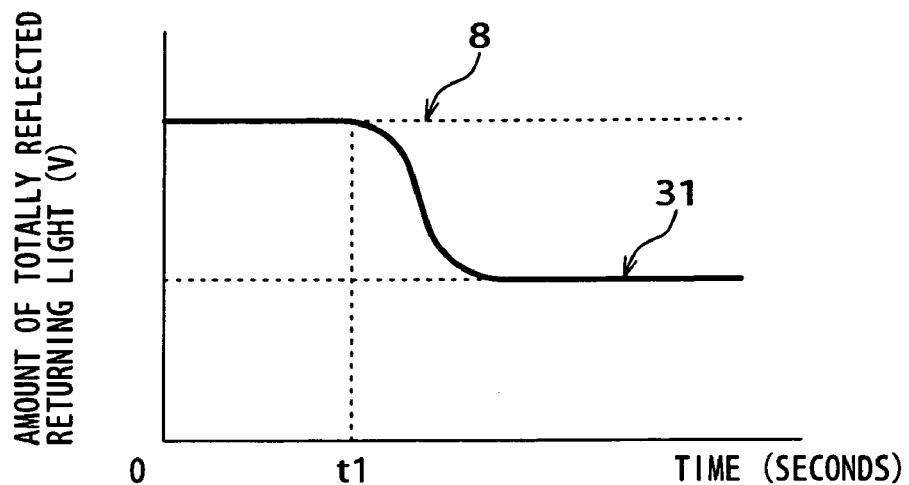
FIG. 13 is a view showing a response waveform for an amount of completely reflected returning light at the time of a gap servo operation in the event that an approach voltage is inputted in a stepped shape.

FIG. 13 shows a response waveform for the amount of completely reflected returning light at the time of a gap servo operation. The response waveform shown in this drawing is a waveform for change in the gap over time. Namely, in this embodiment, the light gathering element 5 can be made to move smoothly from the time of starting the gap servo operation (time t=t1, gap servo start threshold value 8) until the gap attains the target value 31 for the gap servo operation.

As shown in the above, in this embodiment, tilt is adjusted with the SIL 2 in contact with the disc 47 and tilt can therefore be removed in a reliable manner. As a result, it may be possible to carry out an appropriate gap servo operation. Further, compared with the case where, for example, tilting is adjusted with the end surface 2a of SIL 2 in a near field state, and the SIL 2 not in contact with the disc 47, it may be possible to adjust tilting in a straightforward manner without concern about the gap. It is therefore possible to achieve high-quality recording and playback signals as a result of the tilt being substantially zero.

Though preferred embodiments of the present invention are described herein in its preferred form through examples of preferred embodiments thereof with a certain degree of particularity, the present invention should not be construed as to be limited to such examples of embodiments presented herein, so that various modifications, variations, combinations, sub combinations as well as different applications, structures, configurations, etc. are possible without departing from the scope of this invention.

In the above embodiments, tilt is adjusted manually, but automatic control is also possible. For example, in step 1 in FIG. 9, a system may be incorporated where the switch 26 (refer to FIG. 4) does not go on is not carried out even when the approach voltage reaches the final voltage value. In this case, the actuator for tilt control can be given the same configuration as the biaxial actuator 6 and tilt control can be achieved by controlling feedback taking the amount of returning light as the detection amount. Further, it is also possible to provide a switch for switching over to the gap servo process after automatic controlling of tilt.

Figure 14:
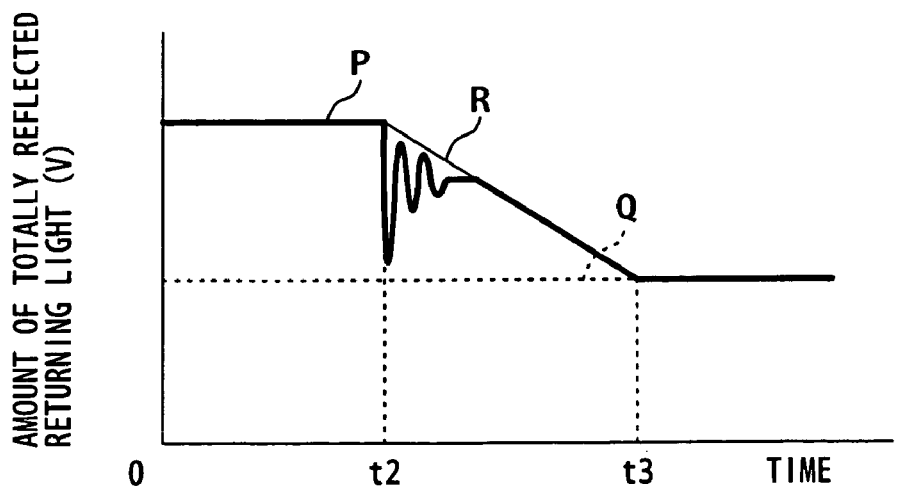
FIG. 14 is a view showing a response waveform for an amount of completely reflected returning light at the time of a gap servo operation in the event that an approach voltage is inputted in a ramp shape.

Further, as shown in FIG. 6, the signal inputted to the approach speed generator 23 is taken to be a step-shaped signal but this is by no means limiting and a ramp-shaped input is also possible. In this case also, the gap servo operation may commence at the time where the end surface 2a of the SIL enters the near field region. In the event that the approach voltage is taken to be a ramp-shape, the original system response for the amount of completely reflected returning light takes on the waveform shown by the symbol R shown in FIG. 14. The actual waveform for the amount of completely reflected returning light is shown by a thick line. The value shown by the symbol P is the amount of completely reflected returning light when the end surface 2a of the SIL is in the far-field (or the gap length when the end surface 2a of the SIL is in the far-field). The value shown by the symbol Q is the amount of completely reflected returning light (or the gap servo target value) corresponding to the gap servo target value. The gap servo starts at time t2, and at time t2, turbulence is caused by the initial velocity of the SIL 2 but the gap target value is reached at time t3.

In the above embodiment, as shown in FIG. 9, radial tilt is adjusted after adjusting the tangential tilt. Tangential tilt may also be adjusted after adjusting radial tilt.

In the above embodiment, tilt adjustment and gap servo operations are carried out based on the amount of returning light. However, instead of using amount of returning light, it is also possible to form the end surface of the SIL from conductive film and control tilt based on electrostatic capacitance between the end surface of the SIL and the disc.

Figure 15:
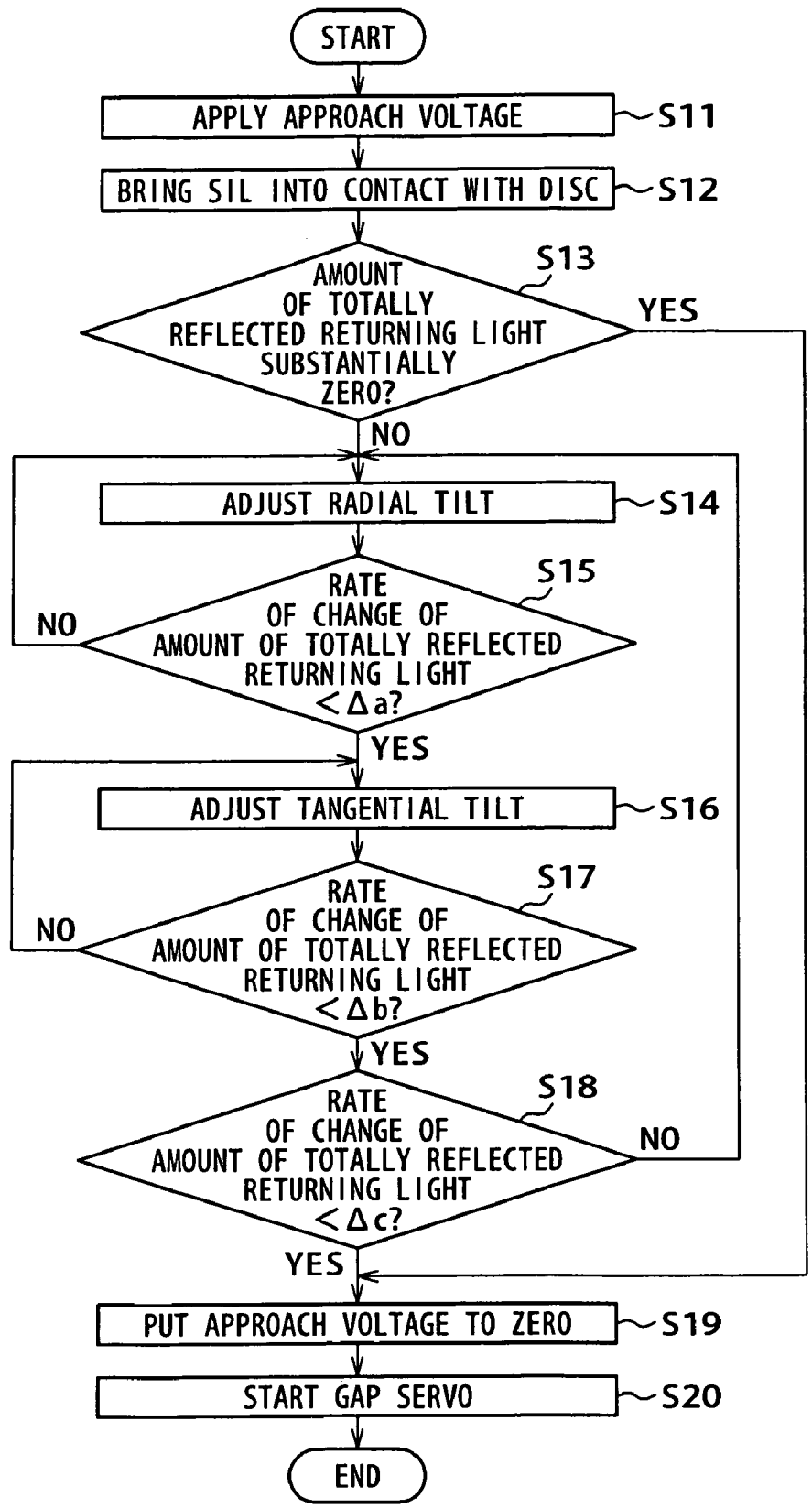
FIG. 15 is a flowchart showing a further specific adjustment method for tilt adjustment.

Next, a description is given of a specific adjustment method for the tilt adjustment shown in FIG. 9, etc. FIG. 15 is a flowchart showing this adjustment method.

In steps 11, 12 and 13, as with the case shown in FIG. 9, an approach voltage for going to the near field is applied to the biaxial actuator 6, the SIL 2 comes into contact with the disc 47, and whether or not the amount of completely reflected returning light is substantially zero is detected. It is also possible to use a tri-axial actuator which may include a tilt actuator as an actuator rather than the biaxial actuator 6 described in the above.

In step 13, in the event that the amount of completely reflected returning light is zero, as with the case shown in FIG. 9, step S19 is proceeded to, the approach voltage is returned to zero, and a gap servo operation is started in step 20. In the event that the amount of completely reflected returning light is not zero regardless of whether the SIL 2 is making contact with the disc, tilt in the radial direction is adjusted, in step 14. This tilt adjustment is carried out until the rate of change of the amount of completely reflected returning light becomes smaller than Δ a, in step 15. This tilt adjustment is described in detail in the following.

Figure 16:
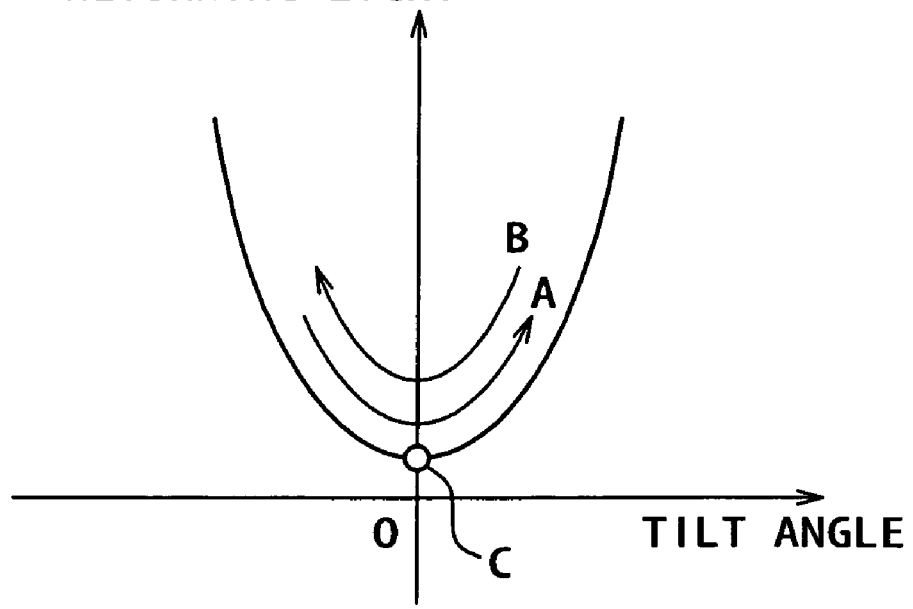
FIG. 16 is a graph showing the relationship between tilt angle and amount of completely reflected returning light in a case where SIL 2 makes contact with the disc.
Figure 17:
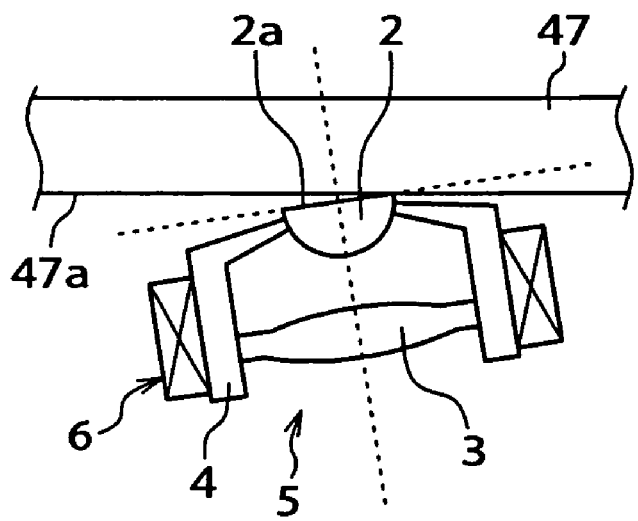
FIG. 17 is a view showing a situation where an SIL tilt angle is negative.

FIG. 16 is a graph showing the relationship between tilt angle and amount of completely reflected returning light in a case where SIL 2 makes contact with the disc 47. From this graph it can be understood that, for example, the relationship between the tilt angle and the amount of completely reflected returning light is, for example, quadratic. In this embodiment, tilt adjustment is carried out by utilizing this relationship. In FIG. 16, a positive or negative tilt angle expresses a direction of inclination of the end surface 2a of the SIL 2. For example, if tilt for the state of the SIL 2 shown in FIG. 10 is positive, tilt for the state of the SIL 2 shown in FIG. 17 is shown to be negative. In the graph in FIG. 16, a section for the symbol C shows a state where tilt is zero. In step 15 above, adjustment of radial tilt is complete in the event that the rate of change of the amount of completely reflected returning light is smaller than Δ a. Here, the rate of change of the amount of completely reflected returning light is a ratio of an amount of returning light before and after inclination of SIL 2 by a prescribed tilt angle, and, in an extreme case, this constitutes a gradient of the curve at each tilt angle shown in FIG. 16. If this gradient is zero, the tilt of SIL 2 is zero (point C).

Figure 18:
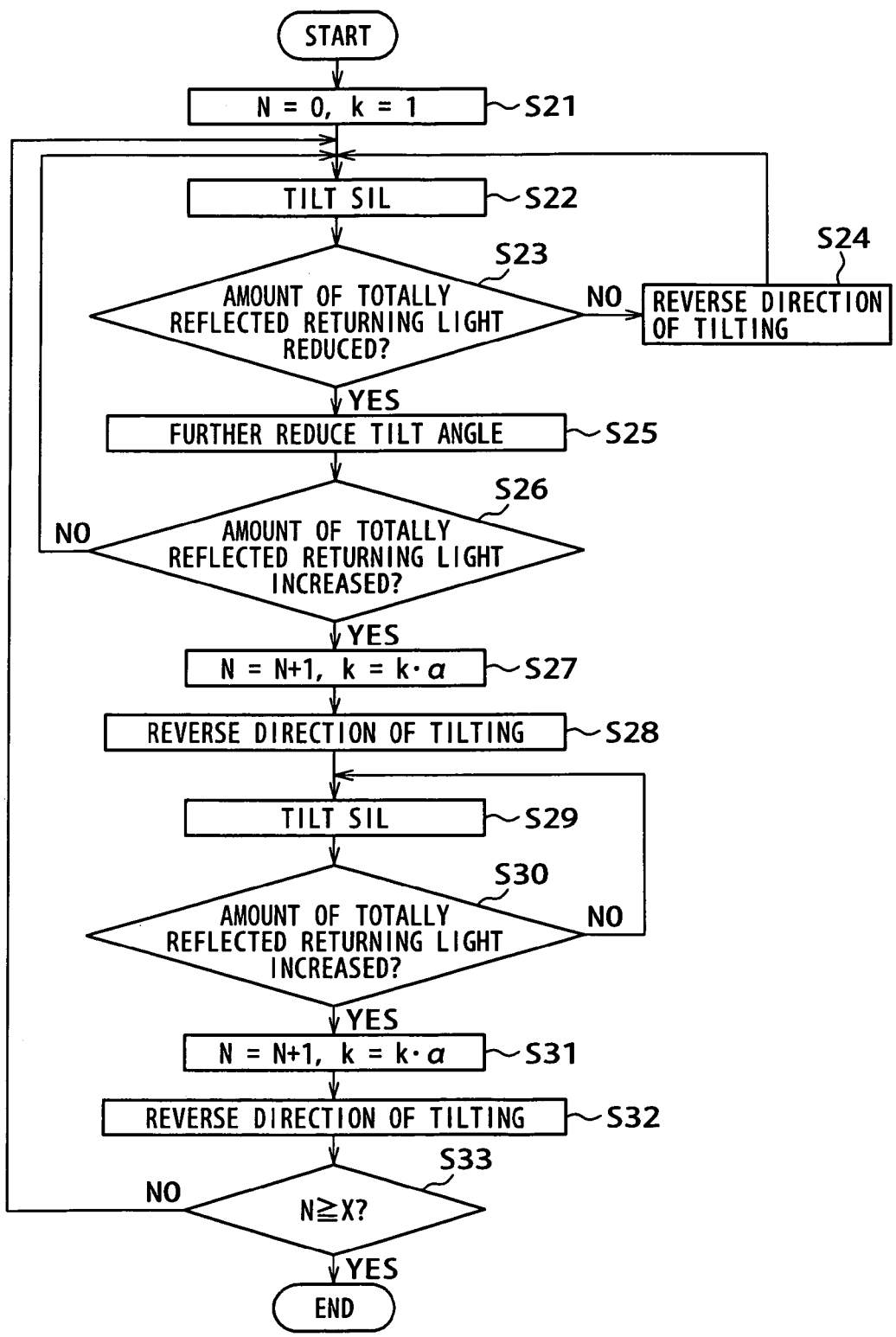
FIG. 18 is a flowchart showing a specific operation for steps 14 and 15 in FIG. 15.
Figure 19:
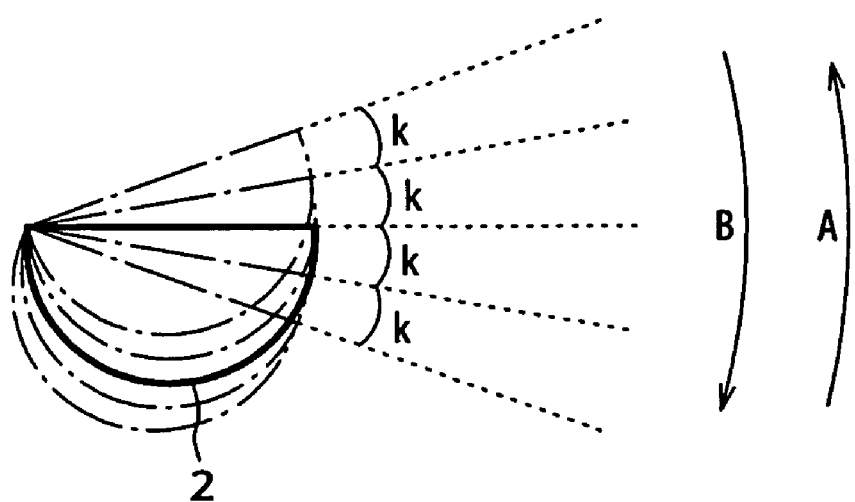
FIG. 19 is a view illustrating direction of inclination and displacement gain k of an SIL.

FIG. 18 is a flowchart showing a specific operation for steps 14 and 15. First, a focusing parameter N of N=0 and a displacement gain k of k=1 are set, in step 21. As shown in FIG. 19, the displacement gain k is an amount of angular displacement for every one time the SIL 2 is inclined by a prescribed tilt angle while adjusting the tilt of the SIL 2. In the graph in FIG. 16, the displacement gain k is an amount of displacement on the horizontal axis. In reality, the displacement gain k is expressed by a voltage etc. applied to a tilt actuator. The focusing parameter N is a count (count value) of every time the polarity of SIL 2 is inverted after the point C is passed through for each time the point C is passed through while adjusting tilt of SIL 2. Here, the prescribed tilt angle may be taken to be any value from, for example, 0.1° to 10°, but this range is by no means limiting and may be set arbitrarily.

When the focusing parameter N and displacement gain k are set, SIL 2 is inclined through a prescribed tilt angle using this displacement gain k, in step 22. Here, in order to illustrate the description of step 14, inclination is taken to be in a radial direction in the direction shown, for example, by arrow A of FIG. 16 and FIG. 19. If SIL 2 is inclined in the direction A, and the amount of completely reflected returning light reduces (YES in step 23), the amount of completely reflected returning light is converging towards point C, it is discerned that the tilt adjustment direction is correct, and the next step is proceeded to. If the amount of completely reflected returning light increases (NO in step 23), polarity of the tilt control is inverted, in step 24, and tilt adjustment is carried out on this occasion to change the tilt angle to the opposing B direction.

Figure 20:
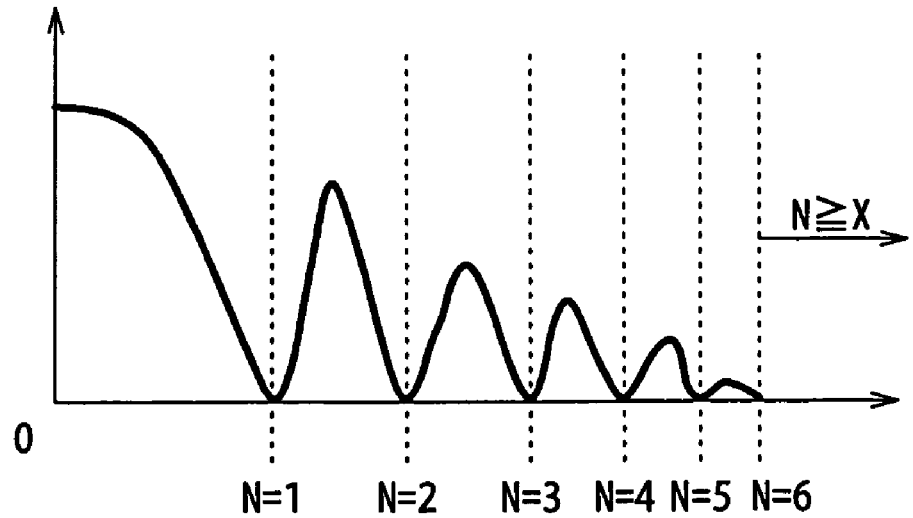
FIG. 20 is a view showing a situation for amount of completely reflected returning light due to the tilt adjustment shown in FIG. 18.

If the amount of completely reflected returning light reduces in step 23, SIL 2 is further inclined by the displacement gain k in the A direction, in step 25. If the amount of completely reflected returning light reduces as a result, further tilt adjustment in the A direction by the displacement gain k takes place, with tilting continuing until the amount of completely reflected returning light passes the point C. If the amount of completely reflected returning light then increases (YES in step 26), the focusing parameter N is incremented by 1, the displacement gain k is multiplied by α (<1), and a new focusing parameter N and displacement gain k are set, in step 27. After this, polarity of the direction of inclination of SIL 2 is inverted, in step 28, and SIL 2 is inclined in the B direction using the newly set displacement gain k, in step 29. In the event that SIL 2 is inclined in the B direction, if the amount of completely reflected returning light reduces (NO in step 30), it is discerned that the tilt adjustment direction is positive, and tilting of SIL 2 using the displacement gain k is continued in the B direction. Conversely, if the amount of completely reflected returning light increases (YES in step 30), then point C is passed through. The focusing parameter N is therefore incremented by 1, the displacement gain k is multiplied by α to give a new displacement gain, in step 31, and polarity of the displacement direction is inverted, in step 32. If the focusing parameter N becomes N≧X (where X may be set arbitrarily) (YES in step 33), then tilt adjustment is complete. The situation for changing of the amount of completely reflected returning light using the tilt adjustment described above is shown in FIG. 20. In FIG. 20, the horizontal axis may also be seen as elapsed time.

In this embodiment, if it is detected in step 23 that the amount of completely reflected returning light reduces, i.e. that the rate of change of the amount of completely reflected returning light is negative, inclination then takes place in the same first direction in step 25. It can then be confirmed whether the direction of inclination of the tilting is in the correct or incorrect direction by detecting whether the amount of completely reflected returning light reduces or increases, i.e. by detecting whether the rate of change of the amount of completely reflected returning light is positive or negative. It is therefore possible as a result for convergence to take place in a direction where tilting becomes smaller and automatic tilt control is possible.

Returning to the description of FIG. 15, in step 15 described above, adjustment of radial tilt is complete in the event that the rate of change of the amount of completely reflected returning light is smaller than Δ a. In step 15, for example, as described above, it can be discerned that the rate of change of the amount of completely reflected returning light has become smaller than Δ a when N≧X. Alternatively, it is also possible for the determination of step 15 to be made by actually calculating the rate of change of the amount of completely reflected returning light i.e. the ratio of the amount of completely reflected returning light for immediately before and the current amount of completely reflected returning light.

Tangential tilt can also be adjusted, in steps 16 and 17, using the same method as for the radial tilt adjustment described above. The radial tilt adjustment and tangential tilt adjustment may also be performed in the reverse order to that described above.

Finally, it is determined whether the amount of completely reflected returning light is less than Δ c (step 18). In this case, this is determined by actually calculating the ratio of the amount of completely reflected returning light for immediately before and the current amount of completely reflected returning light. The prescribed value Δ a (or a prescribed value Δ b at the time of tangential tilt adjustment) may be set to an arbitrary value but a value of approximately zero is preferred to converge adjustment. Further, the prescribed value Δ a in step 18 is a value decided depending on the disc media. It is by no means limiting that the amount of completely reflected returning light becomes zero even if the gap and tilt are zero due to the disc media.

In step 18, if the amount of completely reflected returning light is less than a prescribed value Δ c, after this, as with the case shown in FIG. 9, as a result of making the applied approach voltage zero (step 19), SIL 2 is pulled away from the disc 47, and SIL 2 is returned to the initial position. A gap servo operation is then carried out, in step 20.

What is claimed is:

1. A tilt control method comprising:
    causing a light gathering element, positioned facing a disc recordable with a signal, to come into contact with the disc, wherein the light gathering element is configured to gather light irradiated from a light source as near field light at a position where a distance to the disc constitutes a first distance; and
    controlling tilting of the light gathering element with respect to a signal recording surface of the disc in a state where the light gathering element makes contact with the disc.

2. The tilt control method according to claim 1, further comprising detecting an amount of returning light from the light gathering element being in contact with the disc, wherein
    the controlling includes controlling the tilt based on the detected amount of returning light.

3. The tilt control method according to claim 1, wherein the controlling includes:
    controlling tilting in a radial direction of the disc; and
    controlling tilting in a tangential direction of the disc.

4. The tilt control method according to claim 2, further comprising after the controlling:
    separating the light gathering element from the disc so that a distance between the light gathering element and the disc becomes a second distance which is greater than the first distance, where light is not gathered at the disc as near-field light; and
    controlling separation so that a distance between the separated light gathering element and the disc becomes the first distance.

5. The tilt control method according to claim 1, wherein the disc comprises:
    first region on which the signal is recorded; and
    second region other than the first region on which the signal is not recorded; wherein
    the causing further includes causing the light gathering element to come into contact with the second region.

6. The tilt control method according to claim 2, wherein the controlling further comprises the steps of:
    detecting a rate of change of the amount of returning light when the light gathering element is inclined by a tilt angle; and
    controlling the tilt according to the detected rate of change.

7. The tilt control method according to claim 6, wherein the controlling the tilt according to the detected rate of change further includes terminating the controlling of the tilt if the rate of change is smaller than a threshold value.

8. The tilt control method according to claim 6, wherein the controlling the tilt according to the detected rate of change further includes:
    inclining the light gathering element by a first tilt angle in a radial direction of the disc;
    terminating the controlling of the tilt in the radial direction if the rate of change of the amount of returning light is smaller than a first threshold value at event of the inclination in the radial direction;
    inclining the light gathering element by a second tilt angle in a tangential direction of the disc; and
    terminating the controlling of tilt in the tangential direction if the rate of change of the amount of returning light is smaller than a second threshold value at event of the inclination in the tangential direction.

9. The tilt control method according to claim 6, wherein the controlling the tilt according to the detected rate of change further includes:
    inclining the disc by a first tilt angle in a first direction;
    executing the inclining the disc by the first tilt angle in the first direction if the rate of change is negative in the event of inclination in the inclining the disc by the first tilt angle in the first direction; and
    inclining the disc by a second tilt angle smaller than the first tilt angle in a second direction that is opposite to the first direction if the rate of change is positive in the event that the inclining the disc by the first tilt angle in the first direction is executed at the executing.

10. The tilt control method according to claim 9, wherein the controlling the tilt according to the detected rate of change executes the inclining the disc by the first tilt angle in the first direction, the executing and the inclining the disc by the second tilt angle in the second direction for each tilt in the radial direction and the tangential direction of the disc.

11. An optical disc apparatus comprising;
    a light source for irradiating light;
    a light gathering element, arranged opposite to a disc recordable with a signal and configured to focus light irradiated from the light source onto the disc as near-field light; and
    a controller configured to control a tilt of the light gathering element with respect to a signal recording surface of the disc with the light gathering element made to approach the disc so as to come into contact with the disc.

* * * * *